Aug. 10, 1937.  W. L. POLLARD  2,089,295
VARIABLE SPEED TRANSMISSION
Original Filed Oct. 14, 1933  3 Sheets-Sheet 1

INVENTOR.
Willard Pollard
BY
Jones, Addington, Ames & Seibold
ATTORNEYS

Aug. 10, 1937. W. L. POLLARD 2,089,295
VARIABLE SPEED TRANSMISSION
Original Filed Oct. 14, 1933 3 Sheets-Sheet 2

INVENTOR.
Willard L. Pollard
BY
Jones, Addington Ames & Seibold
ATTORNEYS

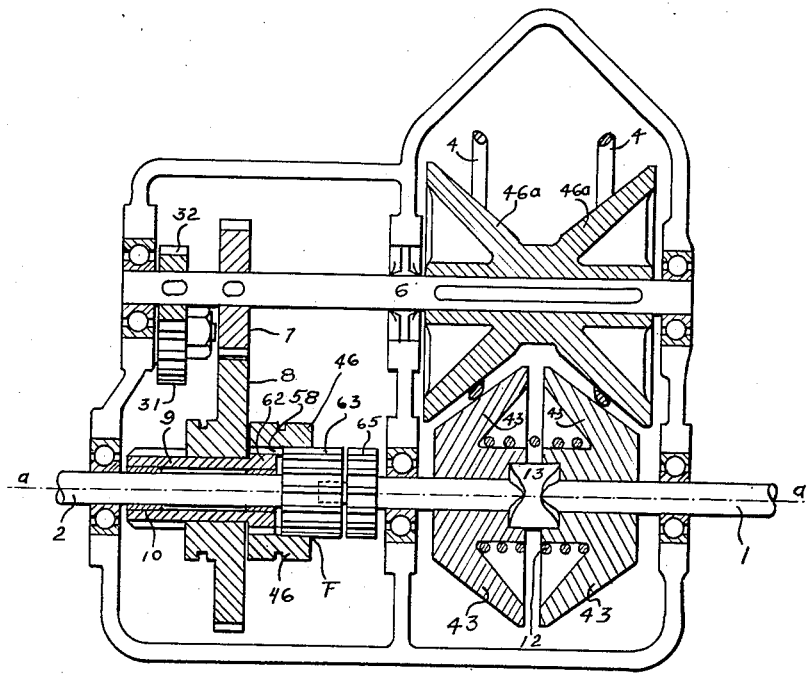
Fig. 6
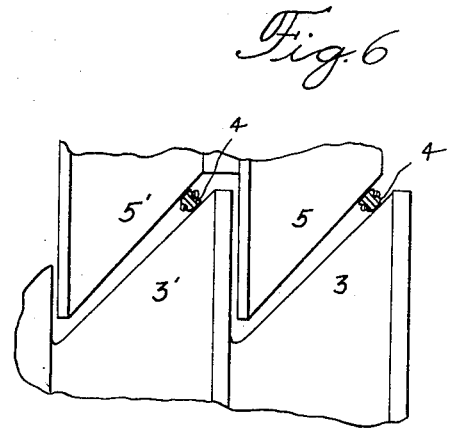
Fig. 7
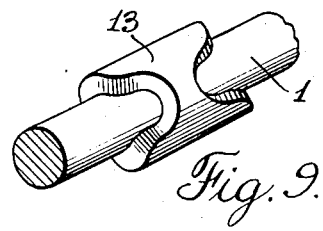
Fig. 9
Fig. 8
INVENTOR.
Willard Pollard
BY
Jones, Addington, Ames & Seibold
ATTORNEYS Patented Aug. 10, 1937

2,089,295

UNITED STATES PATENT OFFICE 2,089,295

VARIABLE SPEED TRANSMISSION

Willard L. Pollard, Evanston, Ill.

Application October 14, 1933, Serial No. 693,596
Renewed June 12, 1936

3 Claims. (Cl. 74—192)

My invention relates to variable speed friction transmissions, and more specifically to variable speed transmissions wherein driving and driven shafts are coaxial and power is transmitted from driving to driven shafts by means of a fixed countershaft which is directly geared to one of the main shafts and frictionally coupled, at variable speed ratio, to the other main shaft.

One object of my invention is to provide an improved variable speed friction transmission in which driving and driven shafts may be coupled directly together for direct drive after the driven shaft has attained the speed of the driving shaft.

Another object of my invention is to provide an improved friction transmission wherein the pressure between the frictional elements is caused by the torque exerted by the frictional elements.

Still another object of my invention is to provide a self-energized variable speed friction transmission, of the type outlined in the preceding paragraph, in which the ratio between the pressure and torque of the friction elements varies with the ratio of transmission in such a manner that this ratio is never excessive.

A further object is to provide a friction transmission in which the flow of power may be divided among several frictional elements placed in parallel.

Another object is to dispose these multiplexed frictional elements outlined in the preceding paragraph in such a manner as to eliminate endwise thrusts on the bearings and to balance the forces on the main shaft.

Another object is to coordinate the multiplexed frictional elements so that they will all be transmitting power at the same speed ratio.

Further objects will appear from the appended description and claims.

In the drawings, which are more or less ideal:—

Fig. 6 is a plan view of another embodiment of my invention, sectioned horizontally through the axis $a$—$a$ of the main shafts;

Fig. 7 is a plan view of a possible method of obtaining multiplex drive with the construction shown in Figure 1;

Fig. 8 is a sectional view showing a cross-section of a friction ring and Fig. 9 is a perspective view of a cam construction.

The nature of my transmission is such as to permit a bilaterally symmetrical construction, with a consequent doubling of capacity. To save time, however, I will describe only one half of each embodiment of my invention, it being understood that a second half, a mirror image of the first, may be, or has been, added.

Figure 1:
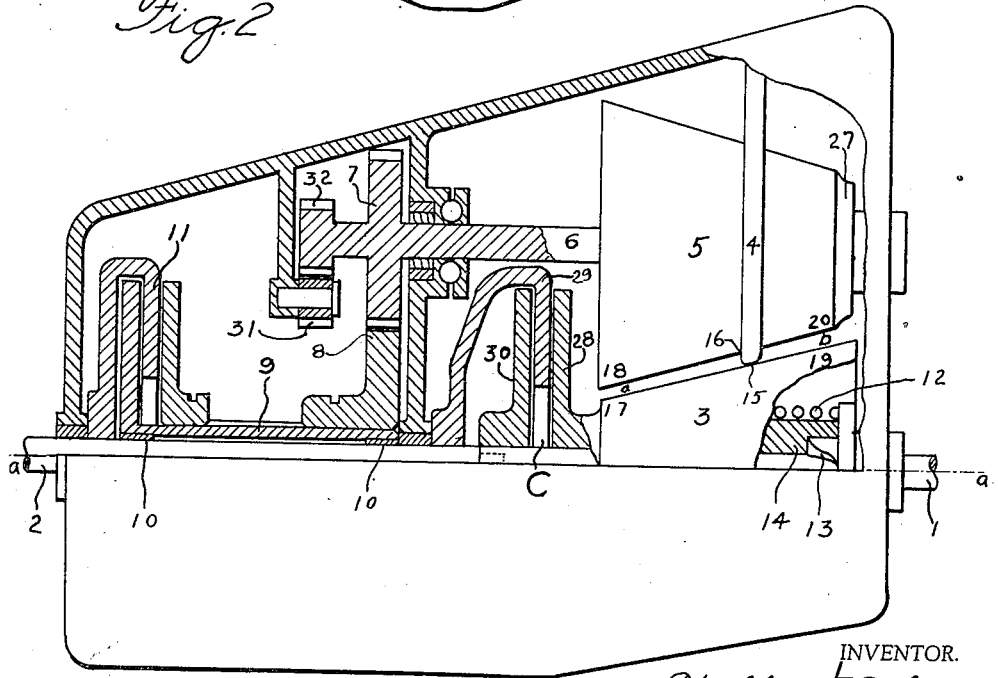
Figure 1 is a plan view of one embodiment of my invention wherein a portion of the casing is cut away and the rearward portions of the mechanism are sectioned horizontally through the axis $a$—$a$ of the main shaft.

Referring to the drawings in detail, and first to Figure 1, the construction shown is a power transmission comprising a driving shaft 1, which may be the motor shaft of an automobile, a driven shaft 2, which may be the propeller shaft of an automobile, and means for transmitting power from the driving shaft to the driven shaft, which means, for forward intermediate speeds, comprise a driving friction cone 3, coaxial, and in general rotatable, with the driving shaft 1; a floating friction ring 4, frictionally engaging the driving cone 3; a driven friction cone 5 also frictionally engaged by the friction ring 4; a countershaft 6, with axis parallel to the axis $a$—$a$ of the driving shaft 1, carrying the driven friction cone 5; a spur gear 7 carried by this countershaft 6; a second spur gear 8 meshing with the countershaft spur gear 7 and splined on the torque tube 9, which torque tube 9 is carried on bearings 10 embracing the driven shaft 2; and a clutch 11 which connects the torque tube to the driven shaft. Power flows from the driving shaft to the driven shaft by the path just outlined.

Considering in more detail the frictional elements and associated construction, the driving friction cone 3 is urged rearwardly by the spring 12 and also by the annular cam 13 keyed to the shaft and bearing on cooperating surfaces in the hub-portion 14 of the cone 3. Any torque between the driving cone 3 and the driving shaft 1 will bring this cam 13 into action. The rearward movement of the driving cone 3 pinches the friction ring 4 against the driven cone 5. The pressure on the ring 4 is such that friction prevents either of the cones 3 and 5 from slipping on the ring 4. The driving shaft 1 drives the driving cone 3 by its reaction through the cam 13; the driving cone 3 frictionally drives the friction ring 4; the friction ring 4 frictionally drives the driven cone 5.

The speed ratio of the transmission of power from the cone 3 to the cone 5 through the ring 4 depends on the position of the ring 4 with respect to the cones 3 and 5. The point of contact 15 between the driving cone 3 and the ring 4, and the point of contact 16 between the ring 4 and the driven cone 5 travel at approximately equal speeds. Wherefore, if the ring 4 has been moved to a position indicated by $a$ (Figure 1) the small-radius portion 17 of the driving cone 3 will share its motion with the large-radius portion 18 of the driven cone 5, and the driven cone 5 will rotate slower than the driving cone 3. If, on the other hand, the ring 4 is moved to a position indicated by $b$, (Figure 1) the large-radius portion 19 of the driving cone 3 will share its motion with the small-radius portion 20 of the driven cone 5, which then will rotate faster than the driving cone 3. With intermediate positions of the ring 4, intermediate conditions will obtain.

It will be seen that the construction provides for transmission of power from the driving cone 3 to the driven cone 5 at a speed ratio continuously variable by the longitudinal shifting of the ring. The means whereby this shifting of the ring 4 may be accomplished will be described later in connection with Figs. 3, 4 and 5.

The theoretically necessary ratio of the backward thrust of the cone 3 to the torque exerted by the driving shaft 1 varies with the position of the ring 4, being least when this ring 4 is operating as the large radius portion 19 of the driving cone. On this account, the driving cone 3 and the driven cone are made with slightly different tapers, in such a manner that the space between the cones 3 and 5 widens at the forward ends 19 and 20 of the cones 3 and 5. As the ring 4 is moved toward position $b$, therefore, the cone 3 is permitted to move rearwardly. The cam 13 will then bear on the hub-portion 14 of the cone 3 with a different portion of its face. This secondary face of the cam 13 is made steeper to reduce the ratio of the backward thrust of the cone 3 to the torque of the shaft 1 upon it.

Considering now the means for coupling the driving and driven shafts 1 and 2 together for direct drive, assume that the ring 4 is in the position $b$ of Figure 1, in which case the ratio of the speed of the driven cone 5 to that of the driving cone 3 will be at a maximum. Assume also that the tooth-ratio of gears 7 and 8 is such that the driving shaft 1 and driven shaft 2 are now running at the same speed. If now the ring 4 is pushed further forward so that it falls into the reduced portion 27 on the cone 5, the driving cone 3, freed of the reaction of the cone 5 through the ring 4, will be driven rearwardly by the spring 12 and the cam 13. With this motion, the clutch plate extension 28 on the driving cone pinches the overhanging clutch plate 29, which is keyed to the driven shaft 2, against the clutch plate 30 which is keyed to the driving shaft 1, thus clutching directly together the driving and driven shafts 1 and 2. Two objects have been accomplished by the slipping out of the ring 5—the friction elements have been rendered inoperative, since the ring 5 is no longer interposed between the cones 3 and 5, and the driving shaft 1 and the driven shaft 2 are coupled together in direct drive. The release of the clutch 11 at this point, will allow the torque tube 2, the gears 7 and 8, the shaft 6 and the cone 5 to coast to a stop.

Considering next the means for leaving the transmission in neutral so that the driving shaft 1 may revolve without driving the driven shaft 2, the spur gear 8 is splined on the torque sleeve 9 and can be moved back out of engagement with the spur gear 7 to a position between mesh and the said spur gear 7 and mesh with the reverse gear 31. The disengagement of the gear 7 with the gear 8 on the countershaft 6 breaks the line of flow of power through the friction elements 3, 4, 5, 6 and 7 to the driven shaft 2. The driving shaft 1 may then revolve without turning the driven shaft 2.

Consider next the means for reverse. Further rearward movement of the spur gear 8 on the torque tube 9 meshes this gear 8 with the reverse idler gear 31. Power will now flow from the driving shaft 1 through the driving cone 3, the friction ring 4, the driven cone 5, the countershaft 6, the reverse spur gear 32, the reverse idler 31, the spur gear 8, the torque tube 9 and the clutch 11 to the driven shaft. The torque thus transmitted to the driven shaft 2 will be opposite in sense to the torque of the driving shaft 1.

Consider now the operation of the transmission. Assume that the ring 4 is in the position $a$ of Figure 1 and that the sliding gear is in its neutral position and out of mesh with the gears. The operator now releases the clutch 11 and meshes the sliding gear 8 with the forward countershaft gear 7. Then he reengages the clutch 11, causing the driven shaft 2 to be driven slowly by the driving shaft 1 through the cone 3, ring 4, cone 5, shaft 6, gear 7, gear 8, torque tube 9 and clutch 11. To increase the speed of the driven shaft 2, he causes the ring 4 to move forward toward the position marked $b$. When the ring 4 reaches the position $b$, the driven shaft 2 will be revolving as fast as the driving shaft 1. Further forward motion of the ring 4 causes the ring 4 to fall into the reduced portion 27 of the driven cone 5. The driving cone 3, freed of the reaction of the driven cone 5, is pushed backward by the cam 13 and energizes the clutch assembly C, thus automatically connecting the driving shaft 1 to the driven shaft 2. The operator then releases the clutch 11, allowing the now inoperative countershaft assembly to coast to a stop.

To make the intermediate speed operative again, the operator re-engages the clutch 11, causing the countershaft assembly to be set in rotation. Next the operator causes the ring 4 to be pushed rearwardly out of the reduced portion 27 of the cone 5 re-establishing the frictional drive between the cone 3 and the cone 5, and causing the cone 3 to move forwardly and release the clutch assembly C. The intermediate speed friction drive is now restored.

If, instead of shifting to the friction drive, the operator wishes immediately to throw out the transmission, he does so by releasing the clutch 11 and sliding the gear 8 to the neutral position between gears 7 and 31.

For reverse, the transmission being in neutral as before described, the operator disengages the clutch 11, slides the gear 8 rearwardly to mesh with the reverse idler 31 and re-engages the clutch 11. The shaft 2 will now be driven in a direction opposite to that of the driven shaft as before described. The speed ratio may be varied by shifting of the ring 4.

Fig. 7 shows a way in which multiplex drive may be obtained with the construction of Fig. 1. Additional driving friction cones 3', 3'', etc., may be carried by the driving shaft 1; and additional driven friction cones 5', 5'', etc., may be carried on the countershaft 6. Rings 4, etc., may be provided for each corresponding pair of friction cones. With such a construction, power would flow by the parallel paths: cone 3, ring 4, cone 5; cone 3', ring 4', cone 5'; and so on. With such a division of power flow, the stresses on the individual friction elements may be greatly reduced.

Figure 2:
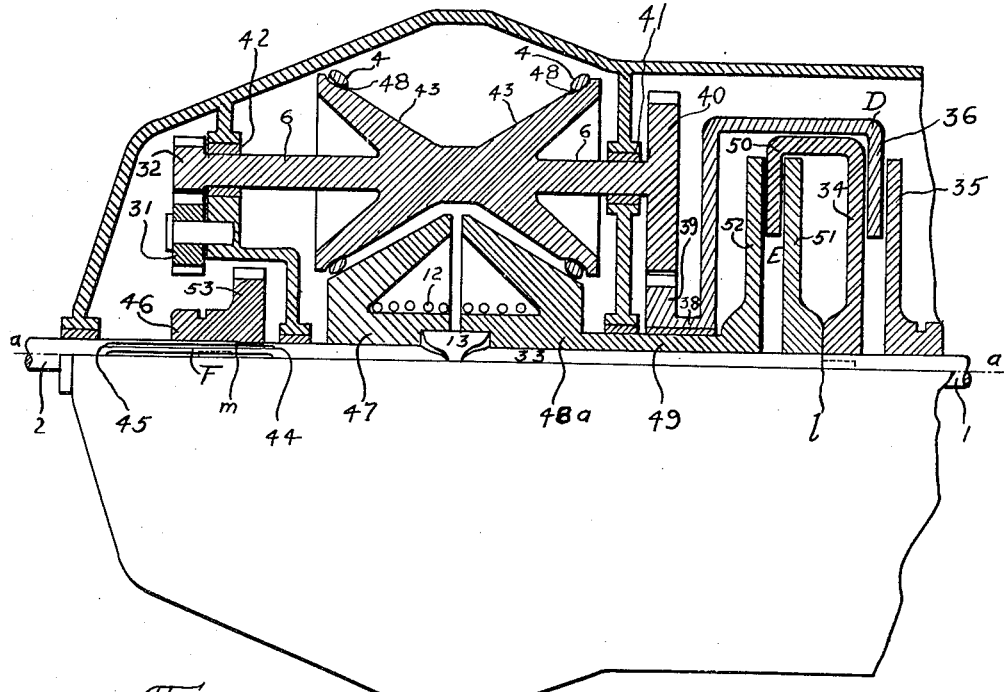
Fig. 2 is a plan view of a second embodiment of my invention wherein the left half is sectioned horizontally through the axis $a$—$a$ of the main shafts.

Fig. 2 shows another embodiment of my invention, a power transmission comprising a driving shaft 1, which may be the motor shaft of an automobile, extending rearwardly to point l; a stub shaft 33, socketed at l in the driving shaft and coaxial therewith, extending rearwardly from l to m; a driven shaft 2 which may be the propeller shaft of an automobile, socketed at m in the stub shaft and coaxial therewith, extending rearwardly from m; and means for the transmission of power from the driving shaft 1 to the driven shaft 2. These means, for forward intermediate speeds, comprise a clutch assembly D, consisting of a clutch plate 34 keyed to the driving shaft 1, a second clutch plate 35 sliding on the driving shaft 1, and an overhanging clutch plate 36 grasped by the clutch plates 34 and 35, and extending rearwardly and inwardly toward the axis a—a to a torque sleeve 38 with which it is integral; a spur gear 39, also integral with the torque tube 38; a second gear 40 meshing with this gear 39; a countershaft 6 carrying the gear 40 and rotating in the bearings 41 and 42 about an axis parallel to the axis a—a of driving, stub and driven shafts 1, 33, and 2, respectively; the duplexed driving friction cones 43 integral with the countershaft 6; the paired friction rings 4; the duplexed driven friction cones 47 and 48a rotatable on the stub shaft 33, and transmitting torque thereto through the cams 13; and dog-clutch means F for connecting the stub shaft 33 to the driven shaft 2, said clutching means comprising splinings 44 on the stub shaft 33, corresponding splinings 45 on the driven shaft 2, and a slidable spline-engaging bridging member 46 embracing the shafts 2 and 33, which bridging member is shown slid so as to engage both sets of splinings 44 and 45, thus coupling together the stub shaft 33 and the driven shaft 2.

The cones 47 and 48a are self energized. The annular cam 13, by virtue of the torque existing between the driven cones 47 and 48a and the stub shaft 33, thrusts the driven cones 47 and 48a outwardly to pinch the friction rings 4 against the duplexed driving friction cones 43. The duplexing of the frictional elements 43, 47 and 48a eliminates end thrust on the bearings of the shafts.

Consider now the automatic means for throwing the transmission into direct drive after the load is speeded up. When the friction rings have reached the positions shown in Fig. 2, they fall into the grooves 48 on the duplexed driving cones 43. This leaves the frictional elements 43, 47 and 48a inoperative and permits the driven cone 48a to be thrust forwardly by the cam 13. The torque tube 49 communicates this thrust to the clutch assembly E, clutching together the stub shaft 33 and driving shaft 1, the overhanging clutch plate member 50 being grasped against the clutch plate 51 by the forward movement of the clutch plate 52. Direct drive now exists from the driving shaft 1, through the clutch assembly E, the stub shaft 33 and the dog-clutch assembly F, to the driven shaft. Release of the clutch assembly D by the operator allows the countershaft assembly to coast to a stop.

Consider next the means for leaving the transmission in neutral. The spline-engaging member 46 may be drawn rearwardly to a position where it no longer engages the splines 44 on the stub shaft 33 but is not far enough back to mesh the gear 53 with the reversing idler 31.

Consider next the method of reverse. The spline-engaging member 46 is drawn rearwardly until the gear 53, which is integral with it, meshes with the reverse idler pinion 31. The clutch assembly D being engaged, power will flow from the driving shaft 1 to the driven shaft 2 by the path: driving shaft 1, clutch plates 34 and 35, clutch plate 36, spur gear 39, countershaft spur gear 40, countershaft 6, reverse gear 32, reverse gear idler 31, gear 53, spline-engaging member 46, driven shaft 2. The direction of rotation of the driven shaft 2 will be opposite the direction of rotation of the driving shaft 1.

Figure 3:
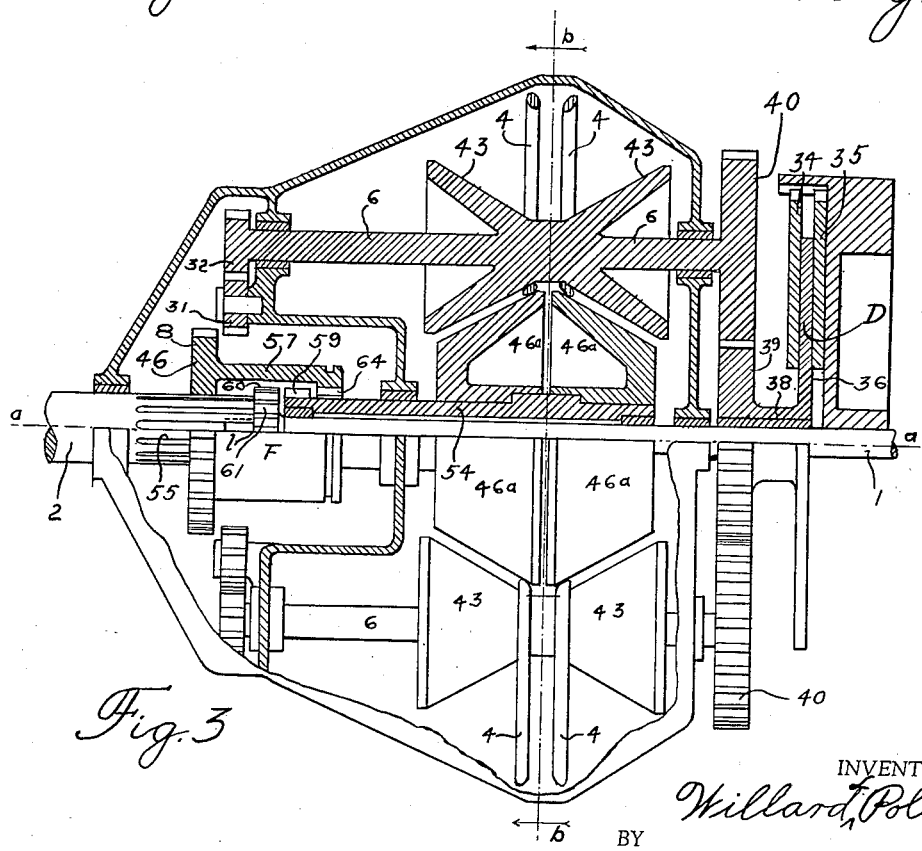
Fig. 3 is a plan view of a third embodiment of my invention, with the casing cut away and the enclosed mechanism sectioned horizontally through the axis $a$—$a$ of main shafts.

Fig. 3 shows another embodiment of my invention, a transmission comprising a driving shaft 1, a driven shaft 2, and means for the transmission of power from the driving shaft 1 to the driven shaft 2, which means, for forward intermediate speeds, comprise a clutch assembly D of which the two clutch plates 34 and 35 rotate with the driving shaft 1 and, in the case of an automobile, form part of the engine's flywheel; a torque sleeve 38 integral with the clutch plate 36 and rotatable about the axis of the driving shaft 1; a spur gear 39 also integral with the torque tube 38; a countershaft spur gear 40, meshing with the spur gear 39; a countershaft 6, parallel to the main shafts 1 and 2; a pair of duplexed driving friction cones 43 carried by the countershaft 6; a pair of friction rings 4; a pair of duplexed driven friction cones 46a; a torque sleeve 54 carrying the driven cones 46a and rotatable about the driving shaft 1; and an overhanging dog-clutch construction F connecting the torque tube 54 to the driven shaft 2, which clutch F consists of splines 55 on the driven shaft 2, teeth 59 on the torque tube 54, and a bridging member 46 splined to the driven shaft 2 and having an overhanging shell portion 57 carrying internal teeth 64 engageable with the teeth 59. In Fig. 3, the clutch F is shown disengaged; the engagement just described may be effected by sliding the bridging member 46 rearwardly. Power flows from driving shaft 1 to driven shaft 2 over the path just outlined.

Direct coupling of the driving shaft 1 and the driven shaft 2 may be accomplished by sliding the bridging member 46 rearwardly so as to engage its internal teeth 64 with the teeth 60 of the pinion 61 at the end of the driving shaft 1.

Reverse is accomplished by sliding the bridging member 46 forwardly from the position shown in the drawings, to mesh the gear 8 with the reverse idler pinion 31, in which case, power flows from the driving shaft to the driven shaft over the path; clutch assembly D, torque tube 38, gear 39, gear 40, countershaft 6, countershaft reverse gear 32, reverse idler 31, gear 8, driven shaft 2.

As shown in the drawings the transmission is in neutral, the bridging member being out of any engagement.

Figures 4, 5:
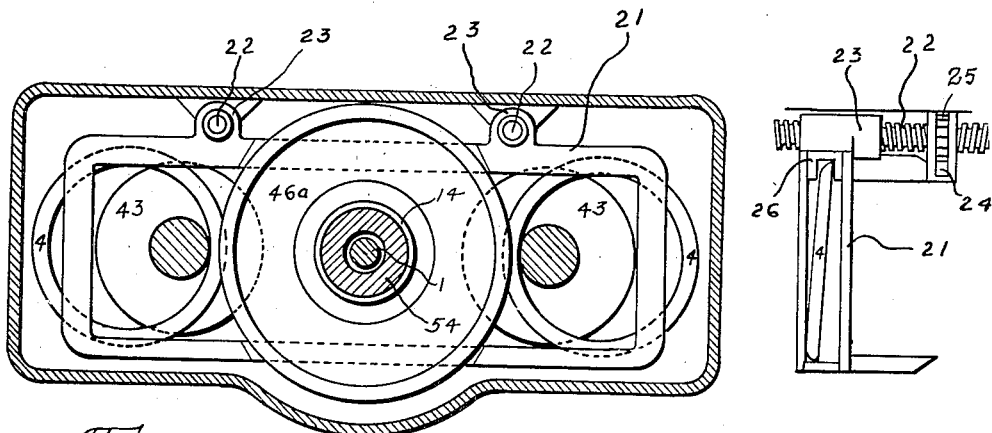
Fig. 4 is a vertical section along the line $b$—$b$ of Fig. 3.
Fig. 5 is a detail profile view of the ring shifting device.

In Figs. 4 and 5 are shown the means for this shifting of the friction rings 4 to vary the speed ratio. These means consist of a frame 21 moved longitudinally with respect to the whole device by rotation of the pair of threaded shafts 22 inside the threaded eyes of the frame 23. The shafts 22 are threaded in the proper direction to give the desired movement to the frames 21. A rack 24 meshes with pinions 25 on the ends of these threaded shafts 22, and motion of this rack 24 causes the two threaded shafts 22 to rotate in synchronism. This synchronized rotation of the threaded shafts moves the frame longitudinally as aforesaid.

This frame 21 loosely embraces the ring 4 as shown in Fig. 5, and in its motion shifts the ring so as to vary the speed ratio between cones 3 and 4. A channel 26, held in the arms of the frame, grasps the uppermost portion of the periphery of the ring. This channel 26 serves to cant the ring 4 in the direction of travel of the frame 21 and causes the ring 4 to follow the frame's motion.

In Fig. 6 is shown another form of my invention, a transmission comprising a driving shaft 1, a driven shaft 2, and means for transmitting power from the driving shaft 1 to the driven shaft 2, which means, for forward intermediate speeds, comprise a pair of duplexed driving friction cones 43; a pair of friction rings 4; a pair of duplexed driven friction cones 46a; a countershaft 6 parallel to the driving shaft 1 and carrying the driven friction cones 46a; a countershaft spur gear 7; a spur gear 8 meshing with the countershaft spur gear 7 and splined to a torque tube 9; dog-clutch means F for connecting the torque sleeve 9 to the driven shaft 2, which dog-clutch comprises a spur gear 62 integral with the torque sleeve 9, a spur gear 63 carried on the end of the driven shaft 2, and a sliding, internally toothed bridging member 46 whose teeth 58 slidably engage the teeth of both the spur gears 62 and 63. Power flows from driving to driven shaft over the path just outlined.

For direct drive, the internally toothed bridging member 46 is slid forwardly on the spur gear 63 so as to disengage itself from the spur gear 62 and engage the spur gear 65. The driving and driven shafts 1 and 2 are then directly connected through the bridging member 46.

For neutral, the bridging member 46 is slid to a middle position on the spur gear 63, so that it engages neither of the spur gears 62 and 65.

For reverse, the bridging member 46 is slid rearwardly to couple the spur gears 62 and 63, and the spur gear 8 is slid rearwardly to mesh with the reversing idler pinion 31. Power then flows from the driving shaft 1 to the driven shaft 2 over the path: driving shaft 1, driving cones 43, rings 4, driven cones 46a, countershaft 6, reverse gear 32, reversing idler 31, spur gear 8, torque tube 9, spur gear 62, bridging member 46, spur gear 63, driven shaft 2.

Fig. 8 shows a friction ring using rubber or other non-metallic substance as the friction material. It consists of a ring 67 of non-metallic material supported on both sides by sheet metal rings 68. The sheet metal rings 68 are held from spreading by rivets 66 which are placed at intervals around the ring. The free surfaces 69 of the material 67 are the working frictional surfaces of the assembly and engage the friction cones 3 and 5. The inner diameter of the sheet metal rings 68 is greater than the inner diameter of the non-metallic ring 67, and the outer diameter of the sheet metal rings 68 is less than the outer diameter of the non-metallic ring 67. This allows the non-metallic material to take all the pressure exerted between the cones 3 and 5.

I have shown only a few of the possible embodiments of my invention, and other embodiments will suggest themselves to those skilled in the art. For the rings shown in the drawings may be substituted any suitable endless member, so I desire it to be understood that in this specification and in the following claims, I mean by "ring", any endless member. Wherefore I desire to be limited only by the spirit of my invention and the scope of the appended claims.

I claim:

1. A variable speed transmission comprising a rotatable driving shaft, a pair of coaxial driving cones tapering in opposite directions and rotatable with said driving shaft, a rotatable driven shaft, a pair of coaxial driven cones also tapering in opposite directions and rotatable with said driven shaft and cooperating with said driving cones respectively, a pair of endless bands engaged by the driving and driven cones respectively, means for shifting said endless bands simultaneously in opposite directions to vary the speed ratio and means for pressing the cones of one pair in opposite directions axially into an engagement with said endless bands.

2. A variable speed transmission comprising a driving cone, a driven cone having its axis parallel to that of the driving cone and having a different angle of taper from that of the driving cone, an endless band engaged by said driving cone and driven cone and shiftable to vary the point of engagement with the cones, and load controlled cam means having cam surfaces of different angularity and controlled by the load on the driven cone for forcing one of said cones axially to control the pressure between the band and cones.

3. A variable speed transmission comprising a rotatable driving shaft, a pair of coaxial driving cones tapering in opposite directions and rotatable with said driving shaft, a rotatable driven shaft, a pair of coaxial driven cones tapering in opposite directions and rotatable with said driven shaft, a pair of endless bands engaged by the driving and driven cones respectively, means for shifting said endless bands simultaneously in opposite directions to vary the speed ratio and load controlled means controlled by the load on the driven shaft tending to vary the distance between the cones of one pair to control the pressure between the cones and bands.

WILLARD L. POLLARD.